United States Patent
Guo et al.

(10) Patent No.: US 10,936,691 B1
(45) Date of Patent: Mar. 2, 2021

(54) STABLE IDENTIFIER ARCHITECTURE

(71) Applicant: Facebook, Inc., Menlo Park, CA (US)

(72) Inventors: Luxi Guo, Bellevue, WA (US); Lian He, Belmont, CA (US); Yimin Song, Sunnyvale, CA (US); Mehul S. Parikh, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 385 days.

(21) Appl. No.: 15/893,567

(22) Filed: Feb. 9, 2018

(51) Int. Cl.
*G06F 16/90* (2019.01)
*G06F 16/955* (2019.01)
*H04L 29/08* (2006.01)
*G06F 16/23* (2019.01)
*G06F 16/9535* (2019.01)
*G06F 16/20* (2019.01)

(52) U.S. Cl.
CPC ........ *G06F 16/955* (2019.01); *G06F 16/2365* (2019.01); *G06F 16/9535* (2019.01); *H04L 67/22* (2013.01)

(58) Field of Classification Search
None
See application file for complete search history.

(56) References Cited

U.S. PATENT DOCUMENTS

| | | | |
|---|---|---|---|
| 8,812,591 B2 * | 8/2014 | Schoen | G06Q 50/01 709/204 |
| 2016/0260129 A1 * | 9/2016 | Fadeev | H04L 67/22 |

* cited by examiner

*Primary Examiner* — Kristopher Andersen
(74) *Attorney, Agent, or Firm* — Fenwick & West LLP

(57) ABSTRACT

A method for tracking a stability of an identifier and selecting content to present on a client device associated with the identifier based on the stability of the identifier. An identifier defines how a client device accesses online systems via a network. An online system stores tentative identifiers. From the stored tentative identifiers, the online system identifies stable identifiers. An identifier's stability is based on the identifier's interactions with online systems via the network. The online system ranks the stable identifiers. The online system stores a quantity of top-ranked identifiers from the ranked stable identifiers. The online system identifies an impression opportunity for a client device associated with an identifier. In embodiments in which the identifier comprises a top-ranked identifier, the online system determines content to include in the impression opportunity based on the identifier and presents the determined content on the client device.

18 Claims, 5 Drawing Sheets

STABLE IDENTIFIER ARCHITECTURE

BACKGROUND

This disclosure relates in general to tracking a stability of an identifier. More specifically, this disclosure relates to tracking a stability of an identifier, and based on the identifier's stability, selecting content to present on a client device associated with the identifier.

An identifier defines a context in which a client device accesses one or more online systems via a network. Specifically, an identifier is described by a particular combination of one or more access parameters that describe how a client device accesses online content. For example, an identifier can be described by at least one of a browser ID, a device ID, an HTML request, and an IP address. The ability to track identifiers enables the association of behaviors with those identifiers and thereby customize content based on behaviors and other information associated with the identifiers. For example, actions and information associated access events for an identifier can be tracked and associated with the identifier. This captured data is valuable because it can be used to customize content to present on client devices.

However, there are also disadvantages to this ability to capture enormous quantities of data. For example, it is difficult and costly to store such an enormous quantity of data. Additionally, many identifiers are ephemeral or transient. In other words, certain identifiers are detected at a low frequency and/or display inconsistent and unpredictable patterns of interaction and behaviors. As a result, such data may be less useful in characterizing identifiers. Furthermore, multiple identifiers may be associated with a single user. For example, a first identifier for a user A's personal laptop, and a second, distinct identifier for the user A's mobile device.

SUMMARY

A method is disclosed for tracking a stability of an identifier and selecting content to present on a client device associated with the identifier based on the identifier's stability. To reduce memory and processing requirements and account for transient and low-stability identifiers, an online system evaluates identifiers to identify which to use in customizing content. These identifiers used for customizing content are termed "active" identifiers. Conversely, when an identifier is presented in a request for content that does not match an active identifier, the content presented for that identifier may not be customized for behavior or other information known about that identifier. Accordingly, by selecting a subset of identifiers as active, the system may more efficiently use identifiers that are actually expected to request content and about which sufficiently valuable information is known to beneficially customize content. This improves data storage requirements by the active system and permits management of transient identifiers.

An identifier defines a context in which a client device accesses an online system via a network. Specifically, an identifier is described by a particular combination of one or more access parameters that describe how a client device accesses online content. For example, an identifier can be described by at least one of a browser ID, a device ID, an HTML request, and an IP address. Information is reported to an online system. Based on the information reported to the online system, the online system determines a stability of the identifier. Based on the stability of the identifier, the identifier may be used to customize or select content for presentation on the client device associated with the identifier.

When an interaction occurs, the identifier associated with the interaction is identified and stored. Identifiers may be described herein as a "tentative identifier," a "stable identifier" or an "active identifier." For convenience, these terms represent different treatment of the identifiers with respect to stability, reliability of characteristics or behaviors associated with the identifier, or in the user of an identifier to customize content. As an identifier becomes more or less interactive or stable, the identifier may be added to a set of active identifiers, to a set of stable but not active identifiers (for convenience termed "stable identifiers"), to a set of tentative identifiers, or purged. Thus, as an identifier interacts with online systems via the network and the online system receives information regarding these interactions, the stability of a tentative identifier may change to be considered stable and ultimately active for content customization.

A tentative identifier is an identifier that infrequently interacts with online systems via the network and/or displays inconsistent patterns of interaction with the online systems. For instance, a tentative identifier may be associated with conflicting demographic information such as one piece of information indicating the tentative identifier is associated with a female and one piece of information indicating the tentative identifier is associated with a male. As another example, a tentative identifier may be an identifier that accesses an online system once every few weeks. In an additional example, a tentative identifier may be an identifier that accesses a different online system each day.

When a tentative identifier surpasses a threshold stability, the tentative identifier is re-classified as a stable identifier. A stable identifier is relatively more stable than a tentative identifier, but relatively less stable than an active identifier (discussed below in further detail).

Stability of an identifier may be based on various factors according to various embodiments. First, the stability of an identifier can depend in part on a frequency at which the identifier interacts with online systems via the network. Second, the stability of an identifier may depend in part on a consistency of the identifier's interactions with the online systems. Consistency of an identifier's interactions with the online systems is based on a correlation of actions associated with the identifier and/or a correlation of demographic information associated with the identifier (which may be derived or estimated from behaviors or actions). For example, highly correlated actions associated with an identifier (e.g., the identifier visiting the same webpage multiple times per day) indicate consistency of the identifier's interactions on the network. Similarly, highly correlated demographic information associated with an identifier (e.g., multiple, unique online systems associated with or reporting the same age range for the identifier) indicate consistency of the identifier's demographic information.

In some embodiments, a tentative identifier is considered stable when it is associated with a particular user (e.g., a person operating the device associated with the identifier). For example, when multiple tentative identifiers eligible to be considered as stable identifiers are determined to be associated with a single user, in some embodiments a single tentative identifier is selected as a stable identifier. Selection of the single tentative identifier as the stable identifier may be based on a stability of the single tentative identifier being greater than stabilities of the alternative tentative identifiers associated with the user. In alternative embodiments in which multiple tentative identifiers are eligible to be identified as stable and have been determined to be associated with a single user, the identifier stabilizer may combine the multiple tentative identifiers to create a compound identifier, and the compound identifier may be selected as the stable identifier.

As a stable identifier interacts with online systems via the network and the online system receives information regarding these interactions, the stability of the stable identifier may change. For example, if the frequency of interactions of the stable identifier with the network increases and/or the consistency of these interactions increases, the stability of the stable identifier may increase accordingly.

Stable identifiers are periodically ranked. In some embodiments stable identifiers are ranked based on the determined stability of the stable identifiers. In some embodiments, the stable identifiers are also ranked based on an expected value of providing content to client devices associated with the stable identifiers. The expected value may be based on a probability that one or more conditions will be satisfied when the content is provided to the client device.

The online system is capable of storing only a threshold quantity of active identifiers. When the quantity of active identifiers stored drops below the threshold quantity of active identifiers that is permitted, one or more stable identifiers are selected and identified as active identifiers. An active identifier is relatively more stable than a tentative identifier and a stable identifier. In other words, an active identifier displays more frequent interactions with online systems and/or displays more consistent patterns of interaction with online systems. The active identifiers are selected based on rankings assigned to the stable identifiers. The online system maintains information about the active identifiers while awaiting impression opportunities for the active identifiers.

The online system identifies an impression opportunity for a client device that is associated with an identifier. The online system determines whether the identifier is an active identifier. If the online system determines that the identifier is an active identifier, the online system selects content to present to the client device associated with the identifier based on information stored about the identifier by the online system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
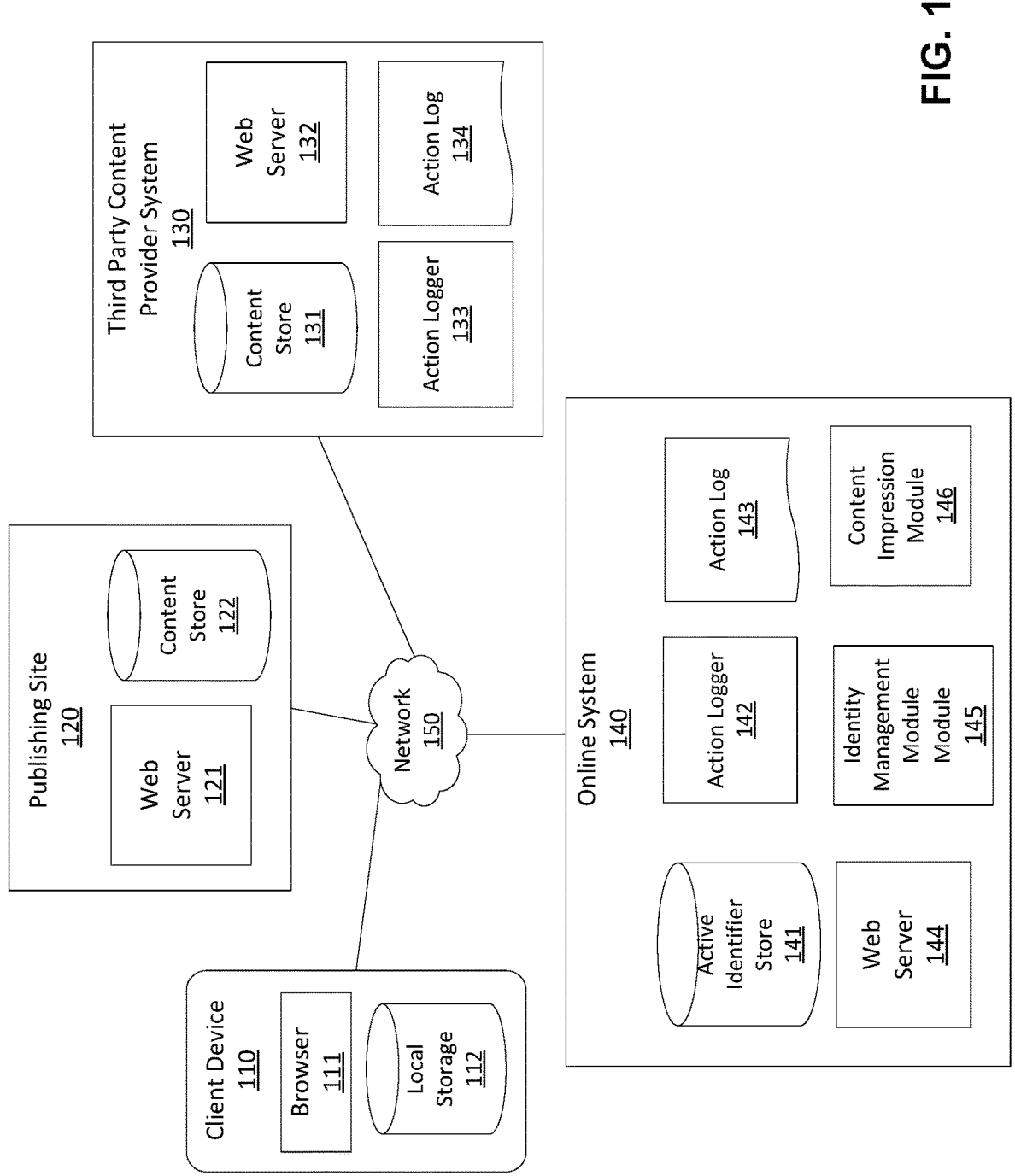
FIG. 1 shows a system environment illustrating the interactions in which an online system may identify identifiers and select active identifiers for customizing content, according to an embodiment.

FIG. 1 shows a system environment illustrating the connections between one or more client devices 110, a publishing site 120, a third party content provider system 130, and an online system 140, interacting with each other via a network 150, according to an embodiment. In various embodiments, each of the client device 110, the publishing site 120, the third party content provider system 130, the online system 140, and the network 150 may include additional, fewer, or different components for various applications. Conventional components such as network interfaces, security functions, load balancers, failover servers, management and network operations consoles, and the like are not shown so as to not obscure the details of the system architecture.

In the system environment shown in FIG. 1, client devices 110 access content across various online systems via the network 150. For example, a client device 110 may access content on the publishing site 120, the third party content provider system 130, and/or the online system 140. When a client device 110 accesses content via the network 150, information regarding the access event is reported to the online system 140. Based on the information provided to the online system 140, the online system 140 can determine an identifier to associate with the access event. The identifier is used to link together content accesses, interactions, and behaviors that may represent the same user such that this information may be used to adjust or customize content for the user and provide content more likely to be relevant and of interest to the user. These identifiers may characterize device access without a user explicitly identifying themselves or establishing log-in credentials. Thus, as used herein, an identifier describes a context in which the access event occurred. Specifically, an identifier is described by a particular combination of one or more access parameters that describe how a client device 110 interacts with systems via the network. The online system 140 also determines a stability of the identifier based on information stored about the identifier for previous access events. By analyzing the stability and consistency of information Based on the stability of the identifier, the identifier may be used to customize or select content for the user of the client device 110.

A client device 110 is a computing device configured to receive user input as well as transmit and/or receive data via the network 150. In one embodiment, the client device 110 is a conventional computer system, such as a desktop or laptop computer. Alternatively, a client device 110 may be a device having computer functionality, such as a personal digital assistant (PDA), a mobile telephone, a smartphone or another suitable device. In some embodiments, a device ID of a client device 110 may be used in part to define or describe an identifier identified by the online system 140 when the client device 110 accesses an online system via the network 150. In one embodiment, a client device 110 executes an application allowing a user of the client device 110 to interact with an online system. For example, a client device 110 executes a browser application (also referred to as a browser 111) to enable interaction between the client device 110 and online systems via the network 150. In another embodiment, a client device 110 interacts with an online system through an application programming interface (API) running on a native operating system of the client device 110, such as IOS® or ANDROID™. In certain embodiments, a browser ID and/or and API can also be used in part to define or describe an identifier associated with an access event initiated by a client device 110.

A client device 110 is configured to communicate via the network 150, which may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

The client device 110 includes a local storage 112 for storing data. The local storage may store data associated with the browser 111. The browser 111 receives web pages from various systems and executes instructions based on the web pages. In an embodiment, the browser 111 stores data received from various online systems in the local storage 112, for example, for caching data for fast access, or for storing cookies of various websites or online systems. The local storage 112 stores cookies representing data received from an online system that is stored on the client device 110 that may be provided to the online system when the client device 110 sends requests to the online system. For example, an online system may store user preferences as cookies. As described in further detail below with regard to the online system 140, data stored by a client device 110 in the local storage 112 may be used to define an identifier associated with an access event initiated by the client device 110. For example, a browser ID stored in the local storage 112 may be used to describe an identifier. In another embodiment, data from various online systems that is stored in the local storage 112 by the browser 111 can be used to describe an identifier associated with an access event. In certain embodiments, the data stored in the local storage 112 is stored as one or more cookies.

The publishing site 120 provides content to the client devices 110. The content provided by the publishing site 120 may include text, images, videos, audio, or combination of various media types. In an embodiment, the publishing site 120 includes a web server 121 and a content store 122. The publishing site 120 receives requests for content or request for web pages from client devices 110. The web server 121 processes the received requests by configuring a web page for sending to the client device 110 that requested the webpage. The web server 121 includes content from content store 122 in the web page. The web server 121 sends the configured web page for presentation via the browser 111 of the client device 110. The browser 111 of the client device 110 receives the web page and renders the web page for presentation via a display screen of the client device 110.

In an embodiment, the publishing site 120 receives content from the third party content provider system 130 and includes the content in the web page sent to the client device 110. In an embodiment the publishing site 120 sends a request to the third party content provider system 130 identifying the content to be included in the web page being configured for presentation via the browser 111. In other embodiments, the publishing site 120 sends one or parameters associated with various content items and the third party content provider system 130 selects a content for including in the web page based on a matching of the one or more parameters with information describing the content. The parameters may describe the content of the web page requested by the user or information received from the user, for example, one or more keywords or terms occurring in the web page. In some embodiments, the third party content provider system 130 determines the content to be included in the webpage based on information associated with the various content items, for example, a number of times that a content item was previously included in webpages, or a time (or time range) associated with the content item during which the content is suggested to be included in web pages. For example, the third party content provider system 130 may store a rate of distribution of the content in web pages of publishing sites 120. The third party content provider system 130 determines whether to include the content item in a web page of a publishing site 120 based on the rate.

The third party content provider system 130 includes a content store 131, a web server 132, an action logger 133, and an action log 134. The content store 131 stores content that is provided to publishing sites 120 for including in the web pages provided by the publishing site 120 to client devices 110.

The web server 132 receives requests for content from the publishing site 120 and sends content for including in the web pages provided by the publishing site 120. The third party content provider system 130 may directly send content to a client device 110 for presentation via the browser 111. In an embodiment, the web server 132 includes tracking pixels in the content provided to the publishing sites 120 such that when the content is presented via the browser 111 of the client device 110, a particular program or code (or set of instructions) is executed by the browser 111. In an embodiment, this code associated with the pixel causes a record of the presentation of content to the client device 110 to be sent to the online system 140. A tracking pixel may be a transparent 1×1 image, an iframe, or other suitable user interface object. In some embodiments, access of a client device 110 to content from a third party content provider system 130 may be associated with an identifier that is linked to the access event. Such embodiments are discussed in greater detail below with regard to the online system 140.

The web server 132 further receives information describing user actions performed on online systems by users via client applications on a client device 110. The action logger 133 stores this information describing user actions in the action log 134. The action log 134 stores a browser identifier associated with the device obtained from the client application and information describing the user action performed. In some embodiments, actions performed on online systems via a client device 110 may be associated with an identifier that is linked to the actions. Such embodiments are discussed in greater detail below with regard to the online system 140.

The online system 140 shown in FIG. 1 includes an active identifier store 141, an action logger 142, an action log 143, a web server 144, an identity management module 145, and a content impression module 146.

As described above, the online system 140 is configured to receive information from a client device 110 when the client device 110 accesses an online system via the network 140. Specifically, the online system receives information from the client device 110 that describes the access event. Based on the information provided to the online system 140, the online system 140 can determine an identifier to associate with the access event. The online system 140 also determines a stability of the identifier based on information stored about the identifier for previous access events. Based on the determined stability of the identifier, the identifier may be used to customize or select content for the user of the client device 110.

An identifier can be classified by the online system 140 as a tentative identifier, a stable identifier, or an active identifier according to its determined stability. A tentative identifier is an identifier that is infrequently initiates interaction with online systems via the network 150 and/or that displays inconsistent patterns of interaction with online systems. A stable identifier displays more frequent interactions with online systems and/or displays more consistent patterns of interaction with online systems than tentative identifiers. An active identifier displays even more frequent interactions with online systems and/or displays even more consistent patterns of interaction with online systems than stable identifiers. Paramount in delineating between stable identifiers and active identifiers is a limited capacity for active identifiers on the online system 140. Tentative identifiers and stable identifiers are not referenced in content selection, but active identifiers are referenced by the online system 140 during content selection.

Turning to the first component of the online system 140, the active identifier store 141 stores active identifiers. To define an active identifier, it is important to first adequately define an identifier. As noted above, an identifier is described by a particular combination of one or more access parameters that describe how a client device 110 interacts with systems via the network. Data items that can describe an identifier include but are not limited to a cookie, a browser ID, a device ID, an HTML request, and an IP address. An identifier may be described by any combination of these data items. For example, in some embodiments, an identifier is a set of data items that identify a client device 110. In such embodiments, an identifier may comprise a device ID. In alternative embodiments, an identifier may comprise both a device ID and a browser ID cookie. In alternative embodiments, an identifier may comprise an alternative combination of data items.

As described above, data items that describe an identifier may be sourced from the local storage 112 of a client device 110. For example, cookies of various websites or online systems accessed by the client device 110 may be stored in the local storage 112 and used to describe an identifier associated with the access events. Furthermore, cookies representing data received from an online system may be stored in the local storage 112 of a client device 110 and used to describe an identifier. For example, user preferences stored as cookies in the local storage 112 of the client device 110 by an online system may be used to describe an identifier. In further embodiments, when a user logs in to an account on an online system via the network 150, the online system can write one or more cookies to the client device 110 for storing on the client device 110, for example, in the local storage 112. These cookies can also be used to describe an identifier associated with the log in event. A browser ID may also be stored in the local storage 112 of a client device 110 and used to describe the identifier.

As described above with regard to the third party content provider system 130, an identifier may also maintain references to actions performed via the network 150. For example, an identifier may be associated with a frequency at which a client device 110 associated with the identifier requests content or web pages. For instance, if a client device 110 associated with a given identifier requests access to the third party content provider system 130, the request may be associated with the identifier. As discussed above with regard to the third party content provider system 130, tracking pixels included in the content provided to the publishing site 120 by a third party content provider system 130 may be used to track an identifier's access to the third party content provider system 130. Association of an identifier with actions performed via the network 150 is described in greater detail below with regard to the action logger 142 and the action log 143.

An identifier can be associated with information that was explicitly shared during an access event associated with the identifier and may also include information inferred by the online system 140. Examples of information associated with an identifier include biographic, demographic, and other types of descriptive information, such as work experience, educational history, gender, hobbies or preferences, location and the like. For example, when demographic information is input into an online system during an access event that is associated with the identifier, the demographic information may be associated with the identifier. An identifier may also be associated with other information provided, for example, images or videos. The data items and actions that describe an identifier may increase in quantity and complexity as the quantity and complexity of interactions between the identifier and the network 150 and/or online systems connected to the network 150 increase over time.

An identifier may be linked to one or more individual people or users. For example, consider an identifier that comprises an IP address for a computer at a public library. Assuming that multiple different people use this computer's IP address to connect to the network 150, the identifier is linked to multiple people. On the other hand, consider an identifier that comprises an IP address for a private, personal computer. Assuming that only the owner of this personal computer uses the computer's IP address to connect to the network 150, the identifier is linked to the owner of the personal computer only. Therefore, an identifier may be linked to one or more individual people or users.

Returning to the active identifier store 141, recall that the active identifier store 141 stores a threshold quantity of active identifiers. An active identifier is relatively more stable than its counterparts of a tentative identifier and a stable identifier. Stability of an identifier is measured based on the identifier's frequency of interaction with online systems via the network 150 and/or a consistency of the identifier's interaction patterns with online systems. Thus relative to a tentative identifier and a stable identifier, an active identifier displays more frequent interactions with online systems and/or displays more consistent patterns of interaction with online systems. Determination of the stability of an identifier and the resulting classification of an identifier is described in further detail with regard to the identity management module 145.

The active identifier store 141 stores active identifiers for a duration of time referred to herein as a time-to-persist. During this time-to-persist, the active identifier store 141 maintains information about the active identifiers that it stores. During the time-to-persist, the active identifier store 141 also awaits impression opportunities for the active identifiers that it stores. The content impression module 141 (discussed in further detail below) indicates arrival of these impression opportunities. In some embodiments, if an impression opportunity does not arise for an active identifier during the time-to-persist, the active identifier is discarded from the active identifier store 141. In alternative embodiments, an active identifier is maintained in the active identifier store 141 until an impression opportunity for the active identifier arises. After the active identifier receives the impression, in some embodiments, the active identifier may be discarded form the active identifier store 141. Removal of active identifiers from the active identifier store 141 frees storage capacity in the active identifier store 141 such that alternative identifiers may be stored in the active identifier store 141. In alternative embodiments, active identifiers are not discarded from the active identifier store 141 after the active identifier receives an impression.

The action logger 142 receives communications about actions associated with identifiers, populating the action log 143 with information about identifier actions. In one embodiment, the action logger receives communications about interactions between an identifier and a third party content provider system 130 from the action log 134 associated with the third party content provider system 130 and/or from the web server 121 of the publishing site 120 that provides content from the third party content provider system 130. Examples of actions include sending a message, uploading an image, viewing content, creating online accounts, visiting web pages, accessing content items, communicating with another identifier, engaging in a transaction, creating a content item, and using an application, among others. A number of actions may involve an object and one or more particular users identifiers, so these actions are associated with those identifiers as well and stored in the action log 143.

The identity management module 145 uses information stored in the action log 143 to select active identifiers for storage in the active identifier store 141. As mentioned above, the active identifier store 141 has a limited storage capacity. Additionally, many identifiers are ephemeral or transient. In other words, certain identifiers are detected at a low frequency or display inconsistent and unpredictable patterns of interaction with the network 150. As a result, such data may be less useful in characterizing identifiers. Therefore, in order to select identifiers for inclusion in the active identifier store 141, only the most permanent, stable, and reliable identifiers should be stored as active identifiers. Active identifiers can then be used by the online system 140 to confidently select content to present to users. The identity management module 145 is further described in relation to FIG. 2 below.

The content impression module 146 receives impression opportunities for active identifiers stored in the active identifier store 141 and uses information about the active identifiers to customize or select content to present to active identifiers. Recall that the content impression module 146 only customizes content for active identifiers. Tentative identifiers and stable identifiers do not receive customized content from the content impression module 146. The content impression module 146 is described in further detail below with regard to FIG. 4.

System Architecture

Figure 2:
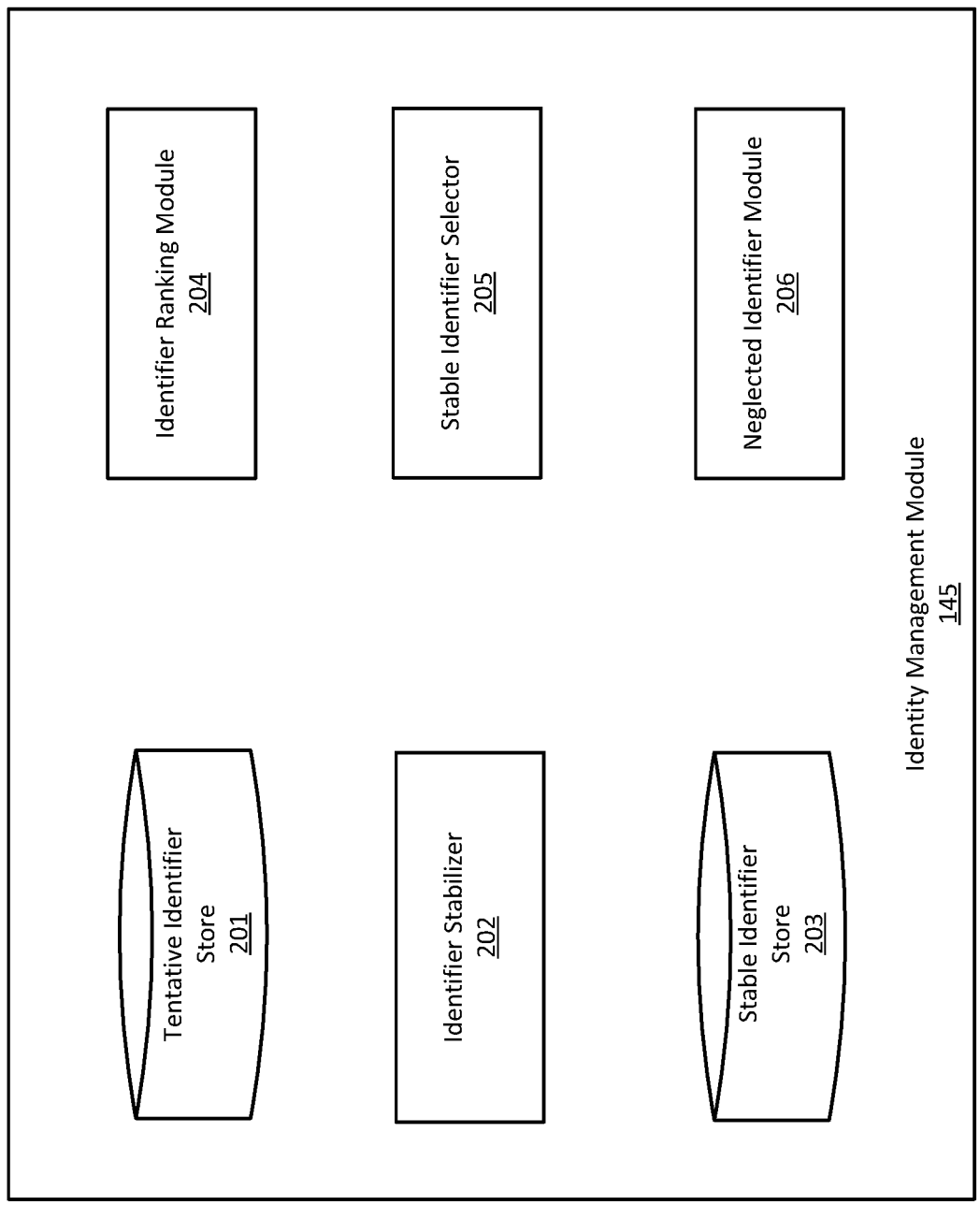
FIG. 2 is a block diagram illustrating the system architecture of an identity management module, according to an embodiment.

FIG. 2 is a block diagram illustrating the system architecture of the identity management module 145, according to an embodiment. The identity management module 145 shown in FIG. 2 includes a tentative identifier store 201, an identifier stabilizer 202, a stable identifier store 203, an identifier ranking module 204, a stable identifier selector 205, and a neglected identifier module 206.

The tentative identifier store 201 stores tentative identifiers. As discussed above, a tentative identifier is relatively less stable than its counterparts of a stable identifier and an active identifier. Specifically, relative to its counterparts, a tentative identifier infrequently interacts with online systems via the network 150 and/or displays inconsistent patterns of interaction with the online systems. For instance, a tentative identifier may be associated with conflicting demographic information such as one piece of information indicating the tentative identifier is associated with a female and one piece of information indicating the tentative identifier is associated with a male. As another example, a tentative identifier may be an identifier that accesses an online system once every few weeks. In an additional example, a tentative identifier may be an identifier that accesses a different online system each day.

The tentative identifier store 201 maintains information about tentative identifiers within a time-to-persist. During this time-to-persist, as a tentative identifier interacts with online systems via the network 150 and the online system 140 receives information regarding these interactions, the stability of the tentative identifier may change. For example, if the frequency of interactions of the tentative identifier with the network 150 increases and/or the consistency of these interactions increases, the stability of the tentative identifier may increase accordingly.

The identifier stabilizer 202 transfers tentative identifiers from the tentative identifier store 201 to the stable identifier store 203 based on a stability of the tentative identifiers. Specifically, if a tentative identifier in the tentative identifier store 201 surpasses a threshold stability during the time-to-persist, the tentative identifier is re-classified as a stable identifier and the identifier stabilizer 202 transfers the newly-classified stable identifier to the stable identifier store 203. On the other hand, if a tentative identifier does not surpass the threshold stability during the time-to-persist, the tentative identifier may be discarded from the tentative identifier store 201.

As discussed above, at least two factors determine the stability of an identifier. First, the stability of an identifier can depend in part on a frequency at which the identifier interacts with online systems via the network 150. In other words, the stability of an identifier can depend in part on a frequency at which the identifier accesses online systems via the network 150. A frequency at which the identifier accesses online systems via the network 150 can be determined by the identifier stabilizer 202 using information from the action log 143 of the online system 140.

Second, the stability of an identifier may depend in part on a consistency of the identifier's interactions with the online systems. Consistency of an identifier's interactions with the online systems is based on a correlation of actions associated with the identifier and/or a correlation of demographic information associated with the identifier. For example, highly correlated actions associated with an identifier (e.g., the identifier visiting the same webpage multiple times per day) indicate consistency of the identifier's interactions on the network 150. Similarly, highly correlated demographic information associated with an identifier (e.g., multiple, unique online systems reporting the same age range for the identifier) indicate consistency of the identifier's demographic information. A consistency of an identifier's interactions can be determined by the identifier stabilizer 202 using information from the action log 143 of the online system 140.

Determination of the stability of an identifier based on identifier information is further described in U.S. patent application Ser. No. 15/685,121, filed on Aug. 24, 2017, which is hereby incorporated by reference in its entirety.

In some embodiments, the identifier stabilizer 202 may also select a tentative identifier to transfer from the tentative identifier store 201 to the stable identifier store 203 based on a user that is determined to be associated with the tentative identifier, and on an existence of additional tentative identifiers associated with the user. More specifically, in some embodiments, a single user may be associated with more than one tentative identifier. For example, a user A may be associated with a first tentative identifier for the user A's personal laptop, and a second, distinct tentative identifier for the user A's mobile device. The identity of a user associated with a tentative identifier can be determined using information (e.g., demographic information) about the tentative identifier from the action log 143 of the online system 140. Furthermore, multiple tentative identifiers can be determined to be associated with a single user by comparing information (e.g., demographic information) stored in the action log 143 for each tentative identifier. In cases in which multiple tentative identifiers are eligible to be transferred to the stable identifier store 203 and are determined to be associated with a single user, in some embodiments the identifier stabilizer 202 may select a single tentative identifier to transfer to the stable identifier store 203. Selection of the single tentative identifier to transfer to the stable identifier store 203 may be based on a stability of the single tentative identifier being greater than the alternative tentative identifiers associated with the user. In certain embodiments, the alternative tentative identifiers that are not transferred are maintained in the tentative identifier store 201. In alternative embodiments, the alternative tentative identifiers are discarded from the tentative identifier store 201. This selection of a single tentative identifier preserves space in the memory of the online system 140. In alternative embodiments in which multiple tentative identifiers are eligible to be transferred to the stable identifier store 203 and have been determined to be associated with a single user, the identifier stabilizer 202 may combine the multiple tentative identifiers to create a compound identifier, and the compound identifier may be transferred to the stable identifier store 203. This generation of a compound identifier not only saves space within the memory of the online system 140, but generates an identifier that is more thoroughly and completely described due to the combination of information from multiple sources.

Identification of users associated with identifiers is further described in U.S. patent application Ser. No. 15/172,040, filed on Jun. 2, 2016, which is hereby incorporated by reference in its entirety.

The stable identifier store 203 stores stable identifiers. As discussed above, a stable identifier is relatively more stable than a tentative identifier, but relatively less stable than an active identifier. To be classified as a stable identifier, an identifier must achieve a threshold level of stability. As discussed with regard to the identifier stabilizer 202, tentative identifiers from the tentative identifier store 201 may be re-classified as stable identifiers and transferred to the stable identifier store 203 once they attain the threshold level of stability.

The stable identifier store 203 maintains information about stable identifiers within a time-to-persist. During this time-to-persist, as a stable identifier interacts with online systems via the network 150 and the online system 140 receives information regarding these interactions, the stability of the stable identifier may change. For example, if the frequency of interactions of the stable identifier with the network 150 increases and/or the consistency of these interactions increases, the stability of the stable identifier may increase accordingly.

Stable identifiers stored in the stable identifier store 203 are periodically ranked by the identifier ranking module 204. Similar to the identifier stabilizer 202, in some embodiments the identifier ranking module 204 ranks the stable identifiers based on the determined stability of the stable identifiers. In some embodiments, the identifier ranking module 204 also ranks the stable identifiers based on an expected value of providing content to client devices 110 associated with the stable identifiers. An expected value of providing content to a client device 110 associated with an identifier is in turn based on a probability that one or more conditions will be satisfied when the content is provided to the client device 110. For example, the expected value of providing content to a client device 110 that is associated with an identifier specifies a monetary amount that the online system 140 receives if the content receives a user interaction.

The stable identifier selector 205 transfers stable identifiers from the stable identifier store 203 to the active identifier store 141 based on the rankings of the stable identifiers and on a storage capacity of the active identifier store 141. As noted above, the active identifier store 141 is capable of storing only a threshold quantity of active identifiers. Therefore the stable identifier selector 205 monitors the quantity of active identifiers stored by the active identifier store 141, and when the quantity of active identifiers stored drops below the threshold quantity of active identifiers that is permitted, the stable identifier selector 205 selects one more stable identifiers from the stable identifier store 203 to transfer to the active identifier store 141. The stable identifier selector 205 selects the stable identifiers from the stable identifier store 203 based on rankings assigned to the stable identifiers by the identifier ranking module 204. Specifically, the stable identifier selector 205 selects the top-ranked stable identifier(s), re-classifies the top-ranked stable identifiers as active identifiers, and transfers the active identifiers to the active identifier store 141.

Recall that the stable identifier store 203 stores the stable identifiers for a time-to-persist. If a stable identifier stored in the stable identifier store 203 is not selected by the stable identifier store 205 to be transferred to the active identifier store 141 during the time-to-persist, the stable identifier may be discarded from the stable identifier store 203.

The neglected identifier module 206 is a feedback mechanism used to modify the parameters of the identifier stabilizer 202 and the identifier ranking module 204. The neglected identifier module 206 compares the top-ranked, stable identifiers transferred from the stable identifier store 203 to the active identifier store 141 with the active identifiers already stored in the active identifier store 141. Based on this comparison, the neglected identifier module 206 identifies neglected identifiers. Neglected identifiers are identifiers that are present in the set of top-ranked, stable identifiers transferred from the stable identifier store 203, but are not present within the active identifier store 141. The neglected identifiers are used to automatically modify parameters used by the identifier stabilizer 202 and the identifier ranking module 204 in selecting identifiers to transfer from the tentative identifier store 201 and in ranking identifiers from the stable identifier store 203, respectively, to ensure that the neglected identifiers are classified as active identifiers in the future. For instance, in one embodiment, the neglected identifier module uses machine learning techniques to determine which parameters enable the identifier stabilizer 202 and/or the identifier ranking module 204 to accurately determine the stability of an identifier.

Overall Process for Tracking Identifiers

Figure 3:
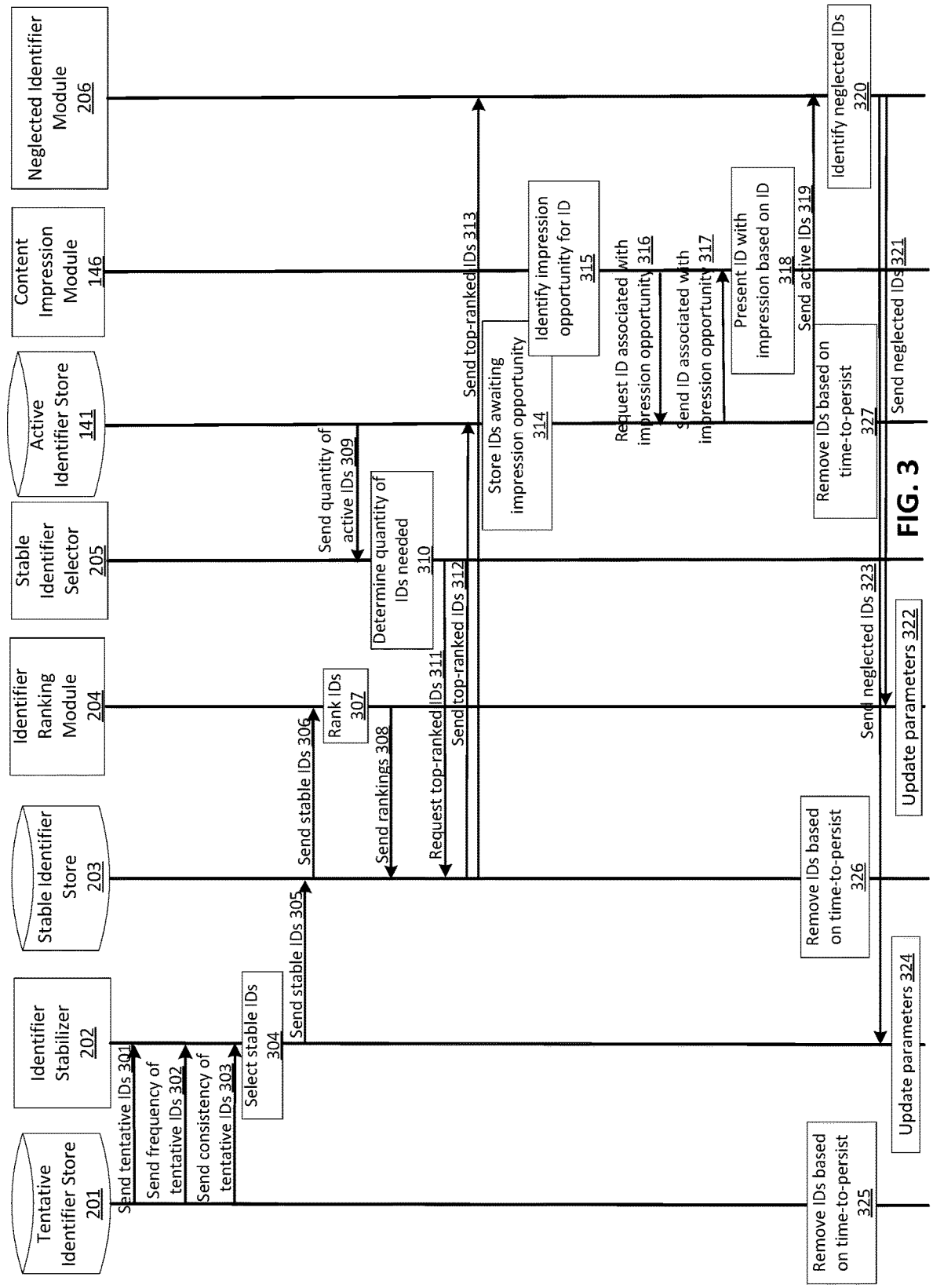
FIG. 3 is an interaction diagram illustrating tracking of identifiers by an online system, according to an embodiment.

FIG. 3 is an interaction diagram illustrating tracking of identifiers by the online system 140, according to an embodiment. The various systems interacting include the active identifier store 141, the content impression module 146, the tentative identifier store 210, the identifier stabilizer 202, the stable identifier store 203, the identifier ranking module 204, the stable identifier selector 205, and the neglected identifier module 206. In other embodiments, there may be more or fewer system components interacting.

As described above, the tentative identifier store 201 stores tentative identifiers. The tentative identifier store 201 sends 301 the stored tentative identifiers to the identifier stabilizer module 202. The tentative identifier store 201 also sends 302 a frequency at which each of the tentative identifiers accesses the network 150 and/or one or more online systems connected to the network 150. Additionally, the tentative identifier store 201 sends 303 a consistency of each tentative identifier's interactions with the network 150 and/or one or more online systems connected to the network 150. An identifier's interactions with the network 150 and/or one or more online systems connected to the network 150 can comprise online actions initiated by the identifier (e.g., a request to access content from a third party content provider system 130) and/or information (e.g., demographic information) shared by the identifier and/or inferred by the online system 140.

Based on the frequencies and the consistencies of the tentative identifiers sent from the tentative identifier store 201 to the identifier stabilizer 202, the identifier stabilizer 202 selects 304 stable identifiers. Specifically, the identifier stabilizer 202 determines a stability of each tentative identifier based on the frequency and the consistency of the tentative identifier. Based on the determined stability of a tentative identifier attaining a threshold stability, the identifier stabilizer 202 re-classifies the tentative identifier as a stable identifier and sends 305 the newly-classified stable identifier to the stable identifier store 203.

In some embodiments, tentative identifiers may also be selected 304 for re-classification and transfer to the stable identifier store 203 based on a user that is associated with the tentative identifiers. Specifically, in cases in which multiple tentative identifiers are known to be associated with a single user, the identifier stabilizer 202 may either select a single tentative identifier from the multiple tentative identifiers to send to the stable identifier store 203, or may combine the multiple tentative identifiers to create a compound identifier that is sent to the stable identifier store 203. In embodiments in which a single tentative identifier is selected, the single tentative identifier may be selected based on its stability score being higher than the other multiple tentative identifiers. In embodiments in which a compound identifier is created, a stability score may be calculated for the compound identifier, taking into account information associated with each of the multiple tentative identifiers that were combined to create the compound identifier.

Stable identifiers stored within the stable identifier store 203 are periodically sent 306 to the identifier ranking module 204. At the identifier ranking module 204, each stable identifier is ranked 307 based on one or more of a stability score and an expected value of presenting content to a user associated with the stable identifier. The rankings determined by the identifier ranking module 204 are sent 308 back to the stable identifier store 203 to be stored in association with their respective stable identifiers.

Periodically, the active identifier store 141 sends 309 an indication of a quantity of active identifiers stored by the active identifier store 141 to the stable identifier selector 205. Based on this quantity, and on an active identifier storage capacity of the active identifier store 141, the stable identifier selector 205 determines 310 a quantity of identifiers needed to reach the active identifier storage capacity of the active identifier store 141. If the quantity of identifiers needed to reach the active identifier storage capacity of the active identifier store 141 is greater than zero, the stable identifier selector 205 requests 311 the needed quantity of top-ranked stable identifiers from the stable identifier store 203. Accordingly, the stable identifier store 203 sends 312 the need quantity of top-ranked stable identifiers to the active identifier store 141, where the top-ranked stable identifiers are re-classified as active identifiers and stored. The stable identifier store 203 also sends 313 the top-ranked stable identifiers to the neglected identifier module 206. The role of the neglected identifier module 206 is discussed in greater detail below.

The active identifier store 141 stores 314 the active identifiers as the active identifiers await impression opportunities. When an impression opportunity occurs, the content impression module 146 identifies 315 the impression opportunity and an identifier associated with the impression opportunity. The content impression module 146 also requests 316 the identifier associated with the impression opportunity from the active identifier store 141. If the identifier associated with the impression opportunity is an active identifier that is stored within the active identifier store 141, the active identifier store 141 sends 317 information associated with the identifier to the content impression module 146. Embodiments in which the identifier associated with the impression opportunity is not an active identifier stored in the active identifier store 141 are discussed in further detail below with regard to FIG. 4.

Based on the information associated with the active identifier, the content impression module 146 selects and presents 318 content to a client device 110 associated with the active identifier. In some embodiments, the content presented 318 to the client device 110 that is associated with the active identifier is customized based on the information associated with the active identifier. For example, if the information associated with the active identifier indicates that a user associated with the active identifier has an upcoming birthday, the content presented to the user may include an advertisement for custom birthday cake designs.

Turning back to the neglected identifier module 206, the active identifier store 141 also sends 319 active identifiers stored in the active identifier store 141 to the neglected identifier module 206. Based on both the active identifiers sent 319 from the active identifier store 141 and the top-ranked stable identifiers sent 313 from the stable identifier store 203, the neglected identifier module 206 identifies 320 neglected identifiers. These neglected identifiers are sent 321 to the identifier ranking module 204 where they are used by the identifier ranking module 204 to update 322 parameters that the identifier ranking module 204 uses in ranking stable identifiers. Similarly, the neglected identifiers are sent 323 to the identifier stabilizer 202 where they are used by the identifier stabilizer 202 to update 324 parameters that the identifier stabilizer 202 uses in selecting tentative identifiers to transfer from the tentative identifier store 201 to the stable identifier store 203. For instance, in one embodiment, the neglected identifier module uses machine learning techniques to determine which parameters enable the identifier stabilizer 202 and/or the identifier ranking module 204 to accurately determine the stability of an identifier.

Finally, recall that each of the tentative identifier store 201, the stable identifier store 203, and the active identifier store 141 is associated with a specific time-to-persist. The time-to-persist designates an amount of time that an identifier stored in a store is maintained within the store. After an identifier's time-to-persist has expired for a given store, the identifier is discarded from the store. Specifically, the tentative identifier store 201 periodically removes 325 tentative identifiers based on time-to-persist, the stable identifier store periodically removes 326 stable identifiers based on time-to-persist, and the active identifier store 141 periodically removes 327 active identifiers based on time-to-persist. This removal of stagnant identifiers continually renews storage space within these three stores of the online system 140.

Content Selection Based on Identifier Tracking

Figure 4:
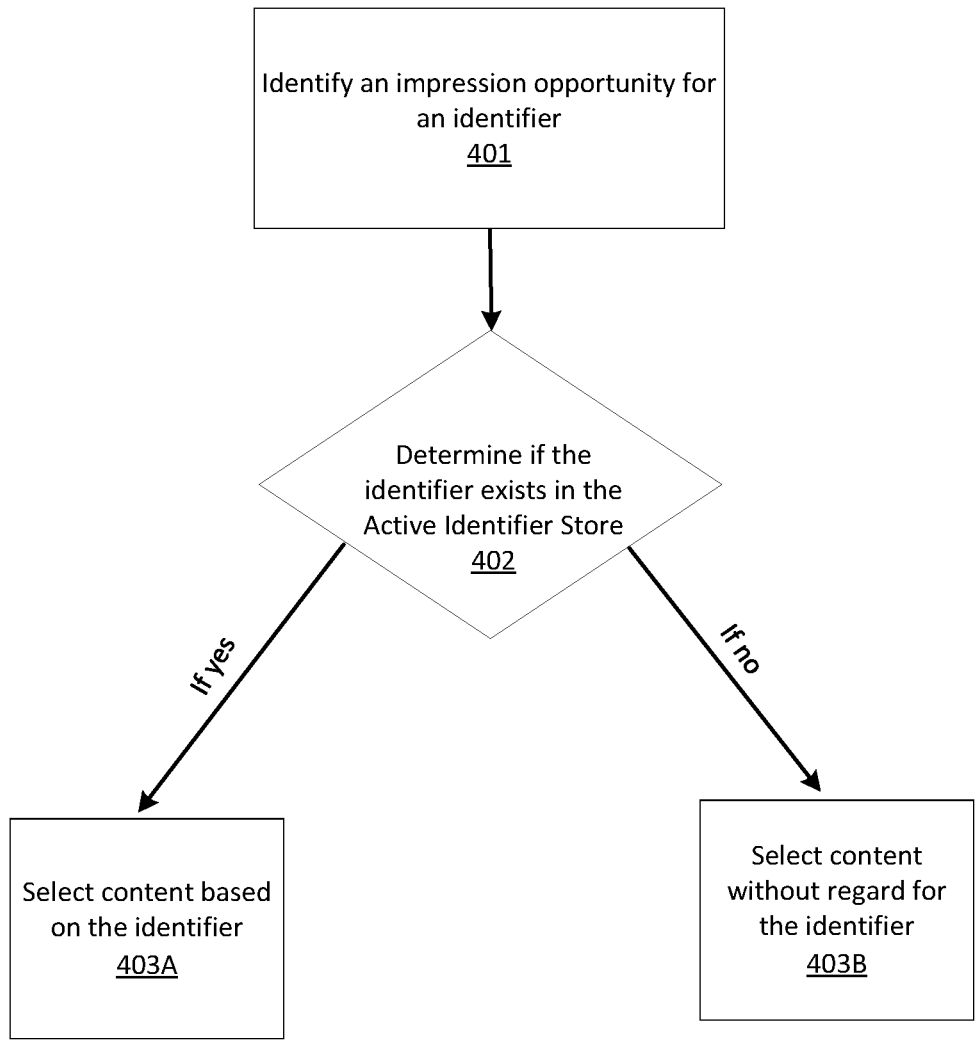
FIG. 4 is a flow chart of a method for identifying content to present to a client device associated with an identifier, according to an embodiment.

FIG. 4 is a flow chart of a method for identifying content to present to a client device 110 that is associated with an identifier, according to an embodiment. In other embodiments, the method may include different and/or additional steps than those shown in FIG. 4. Additionally, steps of the method may be performed in different orders than the order described in conjunction with FIG. 4 in various embodiments.

The content impression module 146 identifies 401 an impression opportunity for a client device 110 that is associated with an identifier. In other words, the content impression module 146 identifies an opportunity to present content to a client device 110 that is associated with an identifier.

The content impression module 146 references the active identifier store 141 to determine 402 whether the identifier is stored as an active identifier in the active identifier store 141.

If the content impression module 146 determines that the identifier is stored as an active identifier in the active identifier store 141, the content impression module 146 selects 403A content for the impression opportunity based on the identifier. Specifically, if the content impression module 146 determines that the identifier is stored as an active identifier in the active identifier store 141, the content impression module 146 selects 403A content to present to the client device associated with the identifier based on information stored about the identifier by the online system 140. In other words, the content impression module 146 customizes content for the identifier.

On the other hand, if the content impression module 146 determines that the identifier is not stored as an active identifier in the active identifier store 141, the content impression module 146 selects 403B content for the impression opportunity without regard for the identifier or information associated with the identifier. In some embodiments, if the content impression module 146 determines that the identifier is not stored as an active identifier in the active identifier store 141, the content impression module 146 selects 403B default content for display on the client device 110 associated with the identifier.

Figure 5:
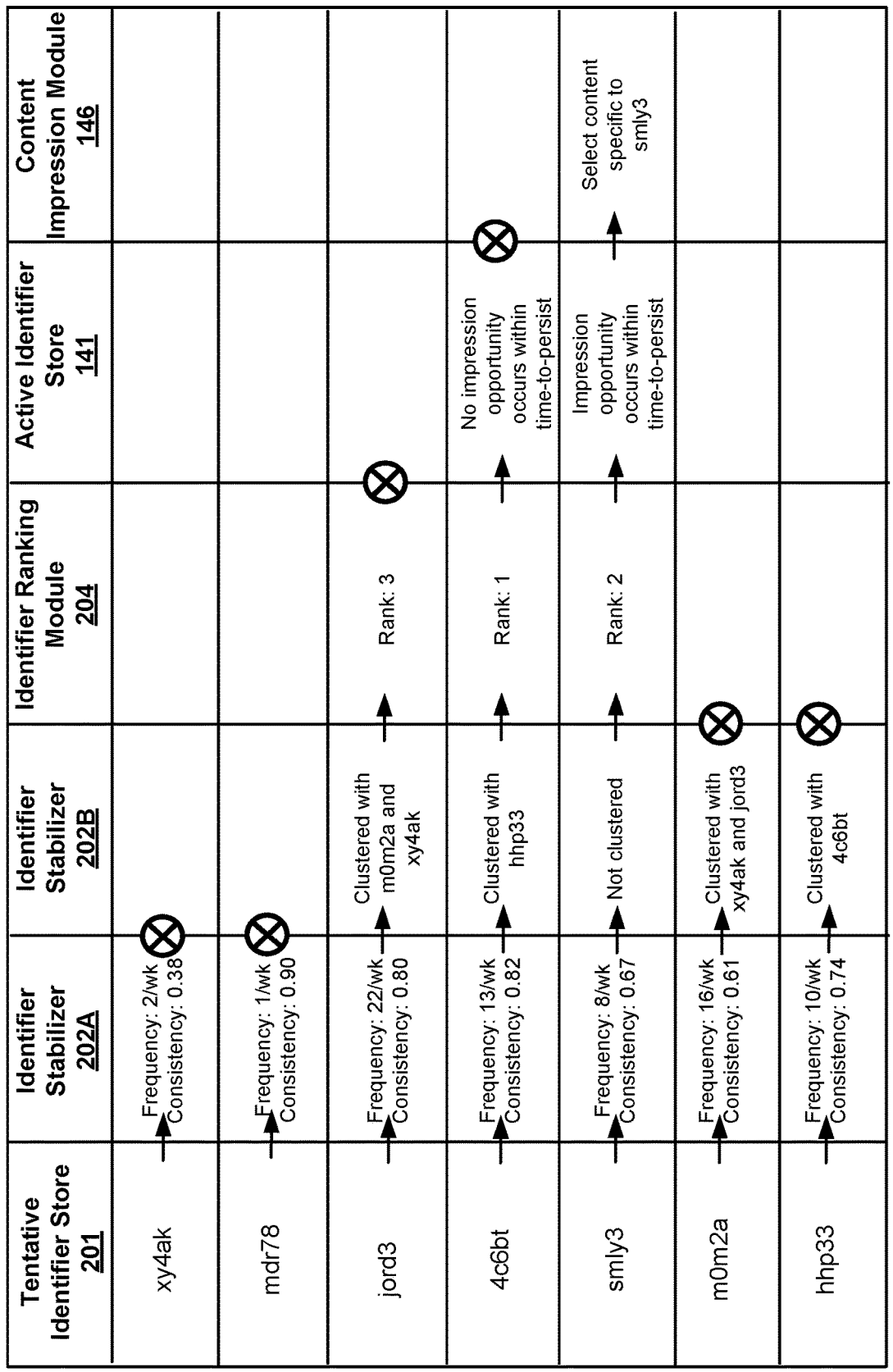
FIG. 5 is an example of identifying content to present to a client device associated with an identifier, according to an embodiment.

FIG. 5 is an example of identifying content to present to a client device 110 associated with an identifier, according to an embodiment. The example depicted in FIG. 5 involves the tentative identifier store 210, the identifier stabilizer 202 (separated into two components of an identifier stabilizer 202A and an identifier stabilizer 202B), the identifier ranking module 204, the active identifier store 141, and the content impression module 146. In alternative examples, there may be more or fewer system components involved in selecting content to present to a client device 110 associated with an identifier.

As shown in FIG. 5, the tentative identifier store 201 stores various tentative identifiers. Specifically, in the example shown in FIG. 5, the tentative identifier store 201 stores tentative identifiers xy4ak, mdr78, jord3, 4c6bt, sm1y3, m0m2a, and hhp33. As described above with regard to FIG. 1, each of these tentative identifiers is described by a particular combination of data item values.

In the example shown in FIG. 5, the identifier stabilizer 202 is broken into two separate system components: the identifier stabilizer 202A and the identifier stabilizer 202B. The identifier stabilizer 202A and the identifier stabilizer 202B perform distinct functions with the ultimate, combined objective of selecting tentative identifiers to re-classify as stable identifiers and subsequently transfer from the tentative identifier store 201 to the stable identifier store 203. The identifier stabilizer 202A determines whether or not a tentative identifier that is stored in the tentative identifier store 201 attains a threshold stability to be re-classified as a stable identifier. Following this re-classification of the tentative identifiers by the identifier stabilizer 202A, the identifier stabilizer 202B determines whether or not the newly-classified stable identifiers are associated with one or more common users. Based on this determination, the identifier stabilizer 202B determines which stable identifiers to transfer to the stable identifier store 203. In alternative embodiments, the identifier stabilizers 202A and 202B may function as a single system component. In further alternative embodiments, the functions performed by the identifier stabilizers 202A and 202B may be performed concurrently, or in an alternative order. For example, in some embodiments the identifier stabilizer 202B may determine whether the tentative identifiers stored within the tentative identifier store 201 are associated with one or more common users prior to the identifier stabilizer 202A determining whether or not the tentative identifiers surpass a threshold stability to be re-classified as stable identifiers and transferred to the stable identifier store 203.

As shown in FIG. 5, each tentative identifier is associated with a frequency and a consistency score. The frequency of a tentative identifier represents the average frequency at which the tentative identifier interacts with the network 150 and/or with one or more online systems connected to the network 150. For example, the tentative identifier xy4ak has a frequency of 2 interactions per week on the network 150. The consistency score of a tentative identifier represents a consistency of the tentative identifier's interactions with the network 150 and/or one or more online systems connected to the network 150. In some embodiments, the consistency score represents a correlation of the tentative identifier's interactions on the network 150. For example, the tentative identifier xy4ak has a consistency score of 0.38 out of 1.00. In other words, the interactions of the tentative identifier xy4ak on the network 150 are 38% correlated. In alternative embodiments, the frequency and/or the consistency of an identifier can be scored differently.

Based on the frequency and the consistency score associated with a tentative identifier, the identifier stabilizer 202A determines whether or not the tentative identifier is eligible to be re-classified as a stable identifier and transferred to the stable identifier store 203. In the example shown in FIG. 5, to be eligible to be re-classified as a stable identifier and transferred to the stable identifier store 203, each tentative identifier attains a threshold frequency of at least 5 interactions per week and a consistency score of at least 0.60. In alternative embodiments, alternative criteria must be attained for a tentative identifier to be eligible to be re-classified as a stable identifier and transferred to the stable identifier store 203. For example, in alternative embodiments, the identifier stabilizer 202A may calculate a single stability score for a tentative identifier based on the frequency and the consistency score associated with the tentative identifier. In such embodiments, the frequency and the consistency score may be weighted differently in the calculation of the stability score. This single stability score may then be used to determine whether the tentative identifier is eligible to be re-classified as a stable identifier and transferred to the stable identifier store 203.

FIG. 5 provides specific examples of determination of eligibility of a tentative identifier for re-classification as a stable identifier. This determination of eligibility is based on the above mentioned criteria of a threshold frequency of at least 5 interactions per week and a consistency score of at least 0.60. For example, as seen in FIG. 5, the tentative identifier xy4ak is determined by the identifier stabilizer 202A as ineligible for re-classification as a stable identifier because the frequency associated with the tentative identifier xy4ak is less than the threshold frequency of 5 interactions per week, and the consistency score associated with the tentative identifier xy4ak is less than the threshold consistency score of 0.60. On the other hand, the tentative identifier smly3 is determined by the identifier stabilizer 202A as eligible for re-classification as a stable identifier because the frequency associated with the tentative identifier smly3 is greater than the threshold frequency of 5 interactions per week, and the consistency score associated with the tentative identifier smly3 is greater than the threshold consistency score of 0.60.

The identifier stabilizer 202B determines whether or not the tentative identifiers selected by the identifier stabilizer 202A as eligible for re-classification as stable identifiers are associated with common users. For example, as shown in FIG. 5, the tentative identifier jord3 is determined to be clustered with the tentative identifiers m0m2a and xy4ak and the tentative identifier smly3 is determined not to be clustered with other tentative identifiers. Note that "clustering" of identifiers as referred to herein indicates that the identifiers have been determined to be associated with a common user.

Based on the clustering of tentative identifiers as determined by the identifier stabilizer 202B, the identifier stabilizer 202B determines which tentative identifiers to re-classify as stable identifiers and transfer to the stable identifier store 203. Tentative identifiers that are not clustered are re-classified and transferred. For example, the smly3 tentative identifier is not clustered, and thus is re-classified as a stable identifier and transferred to the stable identifier store 203.

In the example depicted in FIG. 5, for a set of clustered tentative identifiers, a single tentative identifier is selected for re-classification and transfer to the stable identifier store 203 based on a comparison of the frequencies and the consistency scores of each tentative identifier in the set of clustered tentative identifiers. Specifically, the tentative identifier with the greatest frequency and consistency score is selected for re-classification and transfer to the stable identifier store 203. For example, the tentative identifier jord3 is re-classified as a stable identifier and transferred to the stable identifier store 203 because the frequency and the consistency score associated with the tentative identifier jord3 are greater than the frequencies and the consistency scores associated with the tentative identifiers m0m2a and xy4ak that the tentative identifier jord3 is clustered with.

In alternative embodiments, the identifier stabilizer 202B may select a single tentative identifier from a cluster of tentative identifiers to re-classify and transfer to the stable identifier store 203 based on alternative criteria. Alternatively, the identifier stabilizer 202B may not select a single tentative identifier from a cluster of tentative identifiers, but rather may create a compound identifier from the clustered identifiers and re-classify and transfer this new compound identifier to the stable identifier store 203.

The identifier ranking module 204 ranks the stable identifiers stored in the stable identifier store 203. In the example depicted in FIG. 5, the stable identifiers are ranked based on expected values of the stable identifiers. Assuming that the stable identifier 4c6bt has the greatest expected value, the stable identifier smly3 has the second greatest expected value, and the stable identifier jord3 has the lowest expected value, the identifier ranking module 204 ranks the stable identifiers accordingly. Specifically, the stable identifier 4c6bt has a rank of 1, the stable identifier smly3 has a rank of 2, and the stable identifier jord3 has a rank of 3. In alternative embodiments, alternative criteria may be used to rank the stable identifiers. For example, as discussed above, in some embodiments the identifier ranking module 204 may also rank stable identifiers based on frequencies and consistency scores associated with the stable identifiers.

Based on the storage capacity of the active identifier store 141 and on the rankings assigned to the stable identifiers by the identifier ranking module 204, stable identifiers may be re-classified as active identifiers and transferred to the active identifier store 141. As discussed above, the active identifier store 141 has a limited storage capacity for active identifiers. In other words, the active identifier store 141 can only store a threshold quantity of active identifiers. The example depicted in FIG. 5 assumes that the active identifier store 141 has the capacity to store two additional active identifiers. Accordingly, two stable identifiers may be transferred from the stable identifier store 203 to the active identifier store 141. The top-ranked stable identifiers are transferred from the stable identifier store 203 to the active identifier store 141. Specifically, in the example depicted in FIG. 5, because the active identifier store 141 is able to accommodate two additional identifiers, the two top-ranked stable identifiers are transferred. Therefore, the stable identifiers 4c6bt and smly3 are re-classified as active identifiers and transferred to the active identifier store 141. The stable identifier jord3 with a rank of 3, remains in the stable identifier store 203 where it continues to be monitored by the online system 140.

Once in the active identifier store 141, the active identifiers await an impression opportunity during a time-to-persist. In the example shown in FIG. 5, the active identifier 4c6bt does not receive an impression opportunity within a time-to-persist associated with the active identifier 4c6bt. In some embodiments, active identifiers that do not receive an impression opportunity within a time-to-persist are discarded from the active identifier store 141. In alternative embodiments, an active identifier is maintained in the active identifier store 141 until an impression opportunity for the active identifier arises.

On the other hand, the active identifier smly3 does receive an impression opportunity within a time-to-persist associated with the active identifier smly3. In response to this impression opportunity, the content impression module 146 selects content to present in the impression to the active identifier smly3 based on information stored in the online system 140 about the active identifier smly3. The selected content is them presented on a client device 110 associated with the active identifier smly3. After an active identifier receives the impression, in some embodiments, the active identifier may be discarded form the active identifier store 141. In alternative embodiments, active identifiers are not discarded from the active identifier store 141 after the active identifier receives an impression, but after a time-to-persist for the active identifier expires.

Identifiers that are not stored in the active identifier store 141 can also receive impression opportunities. Specifically, tentative identifiers stored in the tentative identifier store 201 and/or stable identifiers stored in the stable identifier store 203 can also receive impression opportunities. For example, the tentative identifier mdr78 that is stored in the tentative identifier store 203 can receive an impression opportunity. However, unlike for active identifiers, content presented in the impression to an identifier that is not an active identifier (e.g. tentative identifier mdr78) is not based on information stored in the online system 140 about the identifier. Rather, for identifiers that are not active identifiers, the content impression module 146 selects default content to present in the impressions to the identifiers.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   identifying, by an online system, tentative identifiers, wherein an identifier describes how a client device accesses online content, wherein a tentative identifier is an identifier with a stability score that is less than a threshold stability score, and wherein a stability score is a numerical score for an identifier based on at least one of a frequency at which the identifier accesses the online content and a consistency of the identifier's interactions with the online content;
   identifying, by the online system, stable identifiers from the identified tentative identifiers, wherein a stable identifier has a stability score that is greater than the threshold stability score;
   ranking, by the online system, the stable identifiers, the ranking based on stability scores for the stable identifiers;
   identifying, by the online system, a quantity of top-ranked stable identifiers based on the ranking;
   classifying, by the online system, the identified quantity of top-ranked stable identifiers as a set of active identifiers, each active identifier associated with a time-to-persist, wherein a time-to-persist designates an amount of time that an active identifier is maintained in the set of active identifiers;
   identifying, by the online system, a first impression opportunity for a first client device;
   determining that the first client device is associated with a first identifier in the set of active identifiers; and
   responsive to determining that the first device is associated with the first identifier in the set of active identifiers:
      determining, by the online system, content to include in the first impression opportunity for the first client device based on information associated with the first identifier; and
      sending, by the online system, to the client device, the determined content;
   responsive to determining that an impression opportunity associated with a second active identifier in the set of active identifiers does not occur during a time-to-persist associated with the second active identifier, removing the second active identifier from the set of active identifiers;
   responsive to the quantity of active identifiers dropping below a threshold quantity, transferring one or more stable identifiers to the set of active identifiers based on the ranking of the stable identifiers;

identifying, by the online system, a second impression opportunity for a second client device;

determining that the second client device is not associated with any identifiers in the set of active identifiers; and responsive to determining that the second client device is not associated with any identifiers in the set of active identifiers, sending, by the online system, a default content to the second client device.

2. The method of claim 1, wherein identifying stable identifiers from the identified tentative identifiers further comprises, for each tentative identifier:

identifying a frequency at which the tentative identifier accesses online systems via a network;

calculating a stability score for the tentative identifier based on the identified frequency; and responsive to the stability score exceeding the threshold stability score:

identifying the tentative identifier as a stable identifier.

3. The method of claim 1, wherein identifying stable identifiers from the identified tentative identifiers further comprises, for each tentative identifier:

identifying a consistency score for the tentative identifier, the consistency score based on at least one of a correlation of actions associated with the tentative identifier and a correlation of demographic information associated with the tentative identifier;

calculating a stability score for the tentative identifier based on the identified consistency score; and responsive to the stability score exceeding the threshold stability score:

identifying the tentative identifier as a stable identifier.

4. The method of claim 3, wherein one or more of the actions associated with the tentative identifier and the demographic information associated with the tentative identifier are retrieved from more than one data source.

5. The method of claim 1, wherein identifying stable identifiers from the identified tentative identifiers further comprises, for each tentative identifier:

identifying a user associated with the tentative identifier; and responsive to more than one tentative identifier of the identified tentative identifiers being associated with the user:

selecting a single tentative identifier from the more than one tentative identifiers associated with the user as a stable identifier.

6. The method of claim 1, wherein identifying stable identifiers from the identified tentative identifiers further comprises, for each tentative identifier:

identifying a user associated with the tentative identifier; and responsive to more than one tentative identifier of the identified tentative identifiers being associated with the user:

generating a compound identifier by combining the more than one tentative identifiers associated with the user; and selecting the compound identifier as a stable identifier.

7. The method of claim 1, wherein ranking the stable identifiers further comprises, for each stable identifier:

ranking the stable identifier based in part on an expected value of the stable identifier, wherein the expected value of the stable identifier comprises an expected value to the online system of providing content to a client device associated with the stable identifier.

8. The method of claim 1, wherein the quantity of top-ranked identifiers identified by the online system is based on an identifier storage capacity of the online system.

9. The method of claim 1, further comprising removing from storage, a top-ranked identifier based on a time-to-persist.

10. A non-transitory computer-readable medium having instructions for execution by a processor causing the processor to:

identify, by an online system, tentative identifiers, wherein an identifier describes how a client device accesses online content, wherein a tentative identifier is an identifier with a stability score that is less than a threshold stability score, and wherein a stability score is a numerical score for an identifier based on at least one of a frequency at which the identifier accesses the online content and a consistency of the identifier's interactions with the online content;

identify, by the online system, stable identifiers from the identified tentative identifiers, wherein a stable identifier has a stability score that is greater than the threshold stability score;

rank, by the online system, the stable identifiers, the ranking based on stability scores for the stable identifiers;

identify, by the online system, a quantity of top-ranked stable identifiers based on the ranking;

classify, by the online system, the identified quantity of top-ranked stable identifiers as a set of active identifiers, each active identifier associated with a time-to-persist, wherein a time-to-persist designates an amount of time that an active identifier is maintained in the set of active identifiers;

identify, by the online system, a first impression opportunity for a first client device;

determine that the first client device is associated with a first identifier in the set of active identifiers; and responsive to determine that the first device is associated with the first identifier in the set of active identifiers:

determine, by the online system, content to include in the first impression opportunity for the first client device based on information associated with the first identifier; and send, by the online system, to the client device, the determined content;

responsive to that an impression opportunity associated with a second active identifier in the set of active identifiers does not occur during a time-to-persist associated with the second active identifier, remove the second active identifier from the set of active identifiers;

responsive to the quantity of active identifiers dropping below a threshold quantity, transferring one or more stable identifiers to the set of active identifiers based on the ranking of the stable identifiers;

identify, by the online system, a second impression opportunity for a second client device;

determine that the second client device is not associated with any identifiers in the set of active identifiers; and responsive to determine that the second client device is not associated with any identifiers in the set of active identifiers, sending, by the online system, a default content to the second client device.

11. The non-transitory computer-readable medium of claim 10, wherein instructions causing the processor to identify stable identifiers from the identified tentative identifiers further comprise instructions causing the processor to, for each tentative identifier:
    identify a frequency at which the tentative identifier accesses online systems via a network;
    calculate a stability score for the tentative identifier based on the identified frequency; and
    responsive to the stability score exceeding the threshold stability score:
        identify the tentative identifier as a stable identifier.

12. The non-transitory computer-readable medium of claim 10, wherein instructions causing the processor to identify stable identifiers from the identified tentative identifiers further comprise instructions causing the processor to, for each tentative identifier:
    identify a consistency score for the tentative identifier, the consistency score based on at least one of a correlation of actions associated with the tentative identifier and a correlation of demographic information associated with the tentative identifier;
    calculate a stability score for the tentative identifier based on the identified consistency score; and
    responsive to the stability score exceeding the threshold stability score:
        identify the tentative identifier as a stable identifier.

13. The non-transitory computer-readable medium of claim 12, wherein one or more of the actions associated with the tentative identifier and the demographic information associated with the tentative identifier are retrieved from more than one data source.

14. The non-transitory computer-readable medium of claim 10, wherein instructions causing the processor to identify stable identifiers from the identified tentative identifiers further comprise instructions causing the processor to, for each tentative identifier:
    identify a user associated with the tentative identifier; and
    responsive to more than one tentative identifier of the identified tentative identifiers being associated with the user:
        select a single tentative identifier from the more than one tentative identifiers associated with the user as a stable identifier.

15. The non-transitory computer-readable medium of claim 10, wherein instructions causing the processor to identify stable identifiers from the identified tentative identifiers further comprise instructions causing the processor to, for each tentative identifier:
    identify a user associated with the tentative identifier; and
    responsive to more than one tentative identifier of the identified tentative identifiers being associated with the user:
        generate a compound identifier by combining the more than one tentative identifiers associated with the user; and
        select the compound identifier as a stable identifier.

16. The non-transitory computer-readable medium of claim 10, wherein instructions causing the processor to rank the stable identifiers further comprise instructions causing the processor to, for each stable identifier:
    rank the stable identifier based in part on an expected value of the stable identifier, wherein the expected value of the stable identifier comprises an expected value to the online system of providing content to a client device associated with the stable identifier.

17. The non-transitory computer-readable medium of claim 10, wherein the quantity of top-ranked identifiers identified by the online system is based on an identifier storage capacity of the online system.

18. The non-transitory computer-readable medium of claim 10, further comprising instructions causing the processor to remove from storage, a top-ranked identifier based on a time-to-persist.

* * * * *